United States Patent
Murakami et al.

(10) Patent No.: US 8,283,401 B2
(45) Date of Patent: Oct. 9, 2012

(54) CONJUGATED DIENE POLYMER MANUFACTURING METHOD, POLYBUTADIENE, AND RUBBER COMPOSITION UTILIZING THE SAME

(75) Inventors: Masato Murakami, Ichihara (JP); Koji Shiba, Ichihara (JP); Takeshi Shoda, Ichihara (JP); Mitsuharu Anbe, Ichihara (JP)

(73) Assignee: UBE Industries, Ltd (JP)

( * ) Notice: Subject to any disclaimer, the term of this patent is extended or adjusted under 35 U.S.C. 154(b) by 0 days.

(21) Appl. No.: 13/133,084

(22) PCT Filed: Dec. 4, 2009

(86) PCT No.: PCT/JP2009/070406
§ 371 (c)(1),
(2), (4) Date: Jul. 7, 2011

(87) PCT Pub. No.: WO2010/071037
PCT Pub. Date: Jun. 24, 2010

(65) Prior Publication Data
US 2011/0269899 A1 Nov. 3, 2011

(30) Foreign Application Priority Data

Dec. 19, 2008 (JP) ................. 2008-323292
Dec. 19, 2008 (JP) ................. 2008-323293
Apr. 7, 2009 (JP) ................. 2009-092731

(51) Int. Cl.
*C08K 3/34* (2006.01)
*C08L 9/00* (2006.01)
(52) U.S. Cl. ................. 524/492; 524/571
(58) Field of Classification Search ............ 526/340.4, 526/160; 524/526
See application file for complete search history.

(56) References Cited

U.S. PATENT DOCUMENTS
2009/0105401 A1 * 4/2009 Suzuki et al. ................. 524/526

FOREIGN PATENT DOCUMENTS
| JP | 02-045508 | 2/1990 |
| JP | 07-002959 | 1/1995 |
| JP | 2001-139603 | 5/2001 |
| JP | 2004-204229 | 7/2004 |
| JP | 2007-161799 | 6/2007 |
| JP | 2007-161919 | 6/2007 |
| JP | 2007-161921 | 6/2007 |
| JP | 2007-161922 | 6/2007 |
| WO | 2006/049016 A1 | 5/2006 |

OTHER PUBLICATIONS

Arndt, Stefan et al., Cationic Yttrium Methyl Complexes as Functional Models for Polymerization Catalysts of 1,3-Dienes, Angewandte Chemie, International Edition, 2005, vol. 44, No. 45, pp. 7473-7477.

* cited by examiner

*Primary Examiner* — Hui Chin
(74) *Attorney, Agent, or Firm* — Clark Hill PLC

(57) ABSTRACT

Provided by using a catalyst containing an yttrium compound is conjugated diene polymer with very low solution viscosity, improved workability, high degree of branching, and high content of cis-1,4 structures. Also provided is a rubber composition utilizing the polymer and allowing excellent dispersion of reinforcing agent. According to a method of manufacturing a conjugated diene polymer characterized by polymerizing a conjugated diene at 50 to 120° C. in the presence of a catalyst obtained from (A) an yttrium compound, (B) an ionic compound consisting of a non-coordinating anion and a cation, and (C) an organoaluminum compound, the conjugated diene polymer has the following characteristics that: (1) a ratio ($T_{cp}/ML_{1+4}$) between a 5 wt % toluene solution viscosity ($T_{cp}$) measured at 25° C. and a Mooney viscosity ($ML_{1+4}$) at 100° C. is 0.1 to 1.2; and (2) a content of cis-1,4 structures is 80% or higher, and a content of 1,2 structures is lower than 5%.

14 Claims, No Drawings

CONJUGATED DIENE POLYMER MANUFACTURING METHOD, POLYBUTADIENE, AND RUBBER COMPOSITION UTILIZING THE SAME

RELATED/PRIORITY APPLICATION

This application is a National Phase filing regarding International Application No. PCT/JP2009/070406, filed on Dec. 4, 2009, which relies upon the following Japanese Patent applications for priority: Japanese Patent Application No. 2008-323292, filed on Dec. 19, 2008; Japanese Patent Application No. 2008-323293, filed on Dec. 19, 2008, and Japanese Patent Application No. 2009-092731, filed on Apr. 7, 2009.

TECHNICAL FIELD

The present invention relates to a method of manufacturing a conjugated diene polymer having a high content of cis-1,4 structures and a high degree of branching, and to polybutadiene and a rubber composition utilizing the same, particularly a rubber composition for tires utilizing silica as a reinforcing agent.

BACKGROUND ART

Many methods are known for manufacturing a conjugated diene polymer having a high content of cis-1,4 structures, and particularly systems combining a transition metal compound such as titanium, cobalt, nickel, neodymium, etc. and an organoaluminum compound are often used. Pamphlet of International Publication No. 06/049016 (Patent Document 1) discloses a method of manufacturing a conjugated diene polymer having a high content of cis-1,4 structures by a catalyst utilizing an yttrium compound containing a bulky ligand. Normally, a linear conjugated diene polymer with few branches is obtained from such catalytic systems.

However, such a conjugated diene polymer with few branches has a high solution viscosity and a high melt viscosity, and might be difficult to work for some application purposes. To improve from this problem, it has been considered to introduce branch structures into the polymer.

For example, JPH7-2959A (Patent Document 2) discloses a method of manufacturing a branched conjugated diene polymer by reacting a living polymer which is obtained by polymerizing a conjugated diene by using organolithium as an initiator with alkoxysilane as a coupling agent.

JPH2-45508A (Patent Document 3) discloses a method of manufacturing polybutadiene by using a cobalt-type catalyst, wherein the method intends to reduce the solution viscosity of the polybutadiene while maintaining its content of cis-1,4 structures high by adjusting the amounts of use of water and a chain transfer agent.

JP2004-204229A (Patent Document 4) discloses a method of manufacturing a branched conjugated diene polymer having a high content of cis-1,4 structures and a low solution viscosity by polymerizing a conjugated diene at 70 to 140° C. by using a catalyst containing a lanthanide compound.

Polybutadiene, which is one of conjugated diene polymers, is known as a rubber having excellent mechanical properties and thermal properties and used for various purposes including tires. With rising concern for environmental issues in the recent years, a demand for promoting fuel efficiency of also tires has become increasingly stronger. It has been found that in order to promote the fuel efficiency of tires, it is effective to use a rubber composition having a low loss tangent (tan δ) (a low loss property). As specific methods for this, many methods have been proposed that use silica as a reinforcing agent.

However, using silica as a reinforcing agent causes a problem of reducing abrasion resistance, mechanical properties, etc. as compared with when using carbon black, because dispersibility of silica in a rubber composition is poorer than that of carbon black. Regarding this, Patent Document 5 discloses a method for improving dispersibility of a reinforcing agent by using a modified polymer.

CONVENTIONAL ART DOCUMENTS

Patent Documents

Patent Document 1: Pamphlet of International Publication No. 06/049016

Patent Document 2: JPH7-2959A

Patent Document 3: JPH2-45508A

Patent Document 4: JP2004-204229A

Patent Document 5: JP2001-139603A

DISCLOSURE OF INVENTION

Problem to be Solved by the Invention

The present invention aims for providing a conjugated diene polymer having a very low solution viscosity, an improved workability, a high degree of branching, and a high content of cis-1,4 structures by using a catalyst containing an yttrium compound. The present invention also aims for providing a rubber composition utilizing this polymer and having excellent dispersibility for a reinforcing agent.

Means for Solving the Problem

The inventors have found that by polymerizing a conjugated diene compound at a temperature higher than a normal polymerization temperature by using a catalyst containing an yttrium compound, it is possible to obtain a conjugated diene polymer which can have a high degree of branching and a very low solution viscosity while maintaining its content of cis-1,4 structures relatively high. The inventors have also found that a rubber composition utilizing this polymer allows excellent dispersion of a reinforcing agent.

That is, the present invention provides a method of manufacturing a conjugated diene polymer, comprising polymerizing a conjugated diene at 50 to 120° C. in the presence of a catalyst obtained from (A) an yttrium compound, (B) an ionic compound consisting of a non-coordinating anion and a cation, and (C) an organoaluminum compound, wherein the conjugated diene polymer has the following characteristics that:

(1) a ratio ($T_{cp}/ML_{1+4}$) between a 5 wt % toluene solution viscosity ($T_{cp}$) measured at 25° C. and a Mooney viscosity ($ML_{1+4}$) at 100° C. is 0.1 to 1.2; and (2) a content of cis-1,4 structures is 80% or higher, and a content of 1,2 structures is lower than 5%.

It is preferable that the yttrium compound of the catalytic system be an yttrium compound represented by a general formula (1) indicated below.

[Chemical Formula 1]

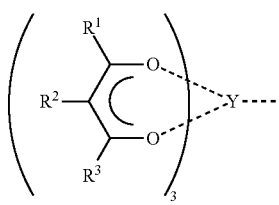

(where $R^1$, $R^2$, and $R^3$ represent hydrogen or a substituent group with 1 to 12 carbon atom/s, O represents an oxygen atom, and Y represents an yttrium atom.)

A preferable conjugated diene is 1,3-butadiene.

The present invention also provides a polybutadiene comprising the following characteristics (1) to (3).

(1) a ratio ($T_{cp}/ML_{1+4}$) between a 5 wt % toluene solution viscosity ($T_{cp}$) measured at 25° C. and a Mooney viscosity ($ML_{1+4}$) at 100° C. is 0.1 to 1.0

(2) a content of cis-1,4 structures is 80% or higher, and a content of 1,2 structures is lower than 5%.

(3) in a relationship between absolute molecular weight and average radius of gyration which are measured by GPC/MALLS method (gel filtration chromatography/multi-angle laser light scattering detection method), an average radius of gyration of molecules with respect to 300,000 g/mol is 30 to 20 nm, and an average radius of gyration of molecules with respect to 1,000,000 g/mol is 50 to 40 nm.

The present invention also provides a rubber composition characterized by containing the polybutadiene described above at 10% by weight or higher, and also provides a rubber composition for tires characterized by further containing silica.

Effect of the Invention

Since a branched conjugated diene polymer obtained according to the present invention has a relatively high content of cis-1,4 structures and a very high degree of branching, it has excellent rubber properties and workability and can be used as a material rubber for various applications such as tire members for which these properties are useful. Further, since the polymer has a low solution viscosity, it can be used as an improving agent for an impact-resistant polystyrene (HIPS), an ABS resin, etc. Furthermore, since the polymer does not use a coupling agent, it has excellent storage stability and thermal stability. Particularly, a rubber composition utilizing this polymer allows excellent dispersion of a reinforcing agent and can be used suitably as a rubber composition for tires having excellent abrasion resistance and low loss property.

BEST MODE FOR CARRYING OUT THE INVENTION

Examples of an yttrium compound which is a component (A) of a catalytic system include: yttrium salt such as yttrium trichloride, yttrium tribromide, yttrium triiodide, yttrium nitrate, yttrium sulfate, yttrium trifluoromethanesulfonate, yttrium acetate, yttrium trifluoro acetate, yttrium malonate, yttrium octylate (ethylhexanoate), yttrium naphthenate, yttrium versatate, yttrium neodecanoate, etc.; alkoxide such as yttrium trimethoxide, yttrium triethoxide, yttrium triisopropoxide, yttrium tributoxide, yttrium triphenoxide, etc.; an organoyttrium compound such as tris acetylacetonato yttrium, tris (hexanedionato)yttrium, tris (heptanedionato)yttrium, tris (dimethylheptanedionato)yttrium, tris (tetramethylheptanedionato)yttrium, tris acetoacetato yttrium, cyclopentadienyl yttrium dichloride, dicyclopentadienyl yttrium chloride, tricyclopentadienyl yttrium, etc.; an organic base complex such as pyridine complex of yttrium salt, picoline complex of yttrium salt, etc.; yttrium salt hydrate; alcohol complex of yttrium salt; etc. Particularly, a complex of yttrium represented by a general formula (1) indicated below is preferable.

[Chemical Formula 2]

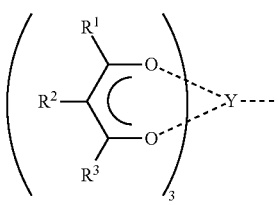

(where $R^1$, $R^2$, and $R^3$ represent hydrogen or a substituent group with 1 to 12 carbon atoms, O represents an oxygen atom, and Y represents an yttrium atom.)

Examples of yttrium compounds represented by the general formula indicated above include tris (acetylacetonato) yttrium, tris (hexanedionato)yttrium, tris (heptanedionato)yttrium, tris (dimethylheptanedionato)yttrium, tris (trimethylheptanedionato)yttrium, tris (tetramethylheptanedionato)yttrium, tris (pentamethylheptanedionato)yttrium, tris (hexamethylheptanedionato)yttrium, tris acetoacetato yttrium, etc.

An ionic compound which is a component (B) of the catalytic system consists of a non-coordinating anion and a cation. The ionic compound may be any combination of a non-coordinating anion and a cation that are arbitrarily selected from publicly-known non-coordinating anions and cations respectively.

Examples of a non-coordinating anion include tetra (phenyl)borate, tetra (fluorophenyl)borate, tetrakis (difluorophenyl)borate, tetrakis (trifluorophenyl)borate, tetrakis (tetrafluorophenyl)borate, tetrakis (pentafluorophenyl)borate, tetrakis (3,5-bistrifluoromethylphenyl)borate, tetrakis (tetrafluoromethylphenyl)borate, tetra (toluoyl)borate, tetra (xylyl)borate, triphenyl (pentafluorophenyl)borate, tris (pentafluorophenyl)(phenyl)borate, tridecahydride-7,8-dicarbaundecaborate, tetrafluoro borate, hexafluorophosphate, etc.

On the other hand, examples of a cation include carbonium cation, oxonium cation, ammonium cation, phosphonium cation, cycloheptatrienyl cation, ferrocenium cation, etc.

Specific examples of carbonium cation include tri-substituted carbonium cation such as triphenyl carbonium cation, tri-substituted phenylcarbonium cation, etc. Specific examples of tri-substituted phenylcarbonium cation include tri (methylphenyl)carbonium cation, tri (dimethylphenyl)carbonium cation, etc.

Specific examples of ammonium cation include: trialkyl ammonium cation such as trimethyl ammonium cation, triethyl ammonium cation, tripropyl ammonium cation, tributyl ammonium cation, tri (n-butyl)ammonium cation, etc.; N,N-dialkyl anilinium cation such as N,N-dimethyl anilinium cation, N,N-diethyl anilinium cation, N,N-2,4,6-pentamethyl anilinium cation, etc.; and dialkyl ammonium cation such as di (isopropyl)ammonium cation, dicyclohexyl ammonium cation, etc.

Specific examples of phosphonium cation include aryl phosphonium cation such as triphenyl phosphonium cation, tetraphenyl phosphonium cation, tri (methylphenyl)phosphonium cation, tetra (methylphenyl)phosphonium cation, tri (dimethylphenyl)phosphonium cation, tetra (dimethylphenyl)phosphonium cation, etc.

A preferable combination of a non-coordinating anion and a cation is a combination of a boron-containing compound and carbocation. Specific examples of ionic compounds include triphenyl carbonium tetrakis (pentafluorophenyl)borate, triphenyl carbonium tetrakis (fluorophenyl)borate, N,N-dimethyl anilinium tetrakis (pentafluorophenyl)borate, 1,1'-dimethyl ferrocenium tetrakis (pentafluorophenyl)borate, etc. These ionic compounds may be used singly or two or more kinds of ionic compounds may be used in combination.

Aluminoxane may be used instead of the ionic compound which is the component (B) and consists of a non-coordinating anion and a cation. Aluminoxane is obtained by bringing an organoaluminum compound into contact with a condensing agent, and examples thereof include a chain aluminoxane and a cyclic aluminoxane which are represented by a general formula (—Al(R')O—)n. (R' represents a hydrocarbon group with 1 to 10 carbon atom/s, and examples thereof include one that is partially substituted for by a halogen atom and/or an alkoxy group. n represents a degree of polymerization, and is 5 or higher, or preferably 10 or higher.) R' may be methyl, ethyl, propyl, isobutyl groups, etc., but a methyl group is preferable. An organoaluminum compound used as the material of aluminoxane may be, for example, trialkyl aluminum such as trimethyl aluminum, triethyl aluminum, triisobutyl aluminum, etc., and a mixture of these trialkyl aluminums.

Among them, an aluminoxane which utilizes a mixture of trimethyl aluminum and tributyl aluminum as a material can be used preferably.

A typical example of the condensing agent described above is water, but other than this, examples thereof include an arbitrary agent with which trialkyl aluminum can cause a condensation reaction, such as absorbed water in an inorganic substance or the like, diol, etc.

Examples of an organoaluminum compound which is a component (C) of the catalytic system include trialkyl aluminum, and other than this, an organoaluminum halide compound such as dialkyl aluminum chloride, dialkyl aluminum bromide, alkyl aluminum sesquichloride, alkyl aluminum sesquibromide, alkyl aluminum dichloride, etc., a organoaluminum hydride compound such as dialkyl aluminum hydride, etc.

Specific examples of trialkyl aluminum include trimethyl aluminum, triethyl aluminum, triisobutyl aluminum, trihexyl aluminum, trioctyl aluminum, tridecyl aluminum, etc.

Specific examples of organoaluminum halide compounds include: dialkyl aluminum chloride such as dimethyl aluminum chloride, diethyl aluminum chloride, etc.; ethyl aluminum sesquichloride; ethyl aluminum dichloride; etc. Specific examples of organoaluminum hydride compounds include diethyl aluminum hydride, diisobutyl aluminum hydride, ethyl aluminum sesquihydride, etc.

These organoaluminum compounds may be used singly or two or more kinds of organoaluminum compounds may be used in combination.

The amounts of the catalyst components (A) to (C) and the ratio among them are adjusted as may be needed to impart an intended property to the polymer to be obtained. Normally, the amount of the component (A) is preferably 0.0001 to 0.5 mmol and particularly preferably 0.0005 to 0.1 with respect to 100 g of conjugated diene monomer. The molar ratio (A)/(B) between the component (A) and the component (B) is preferably 1/1.0 to 1/5.0 and particularly preferably 1/1.0 to 1/3.0. The molar ratio (A)/(C) between the component (A) and the component (C) is preferably 1/1 to 1/5000 and particularly preferably 1/10 to 1/2000.

The catalyst components may be mixed either in the presence of or in the absence of a conjugated diene to be polymerized. The mixing method is not particularly limited, but may be carried out as follows, for example.

(1) To add the component (C) to an inert organic solvent and then add the component (A) and the component (B) in an arbitrary order.

(2) To add the component (C) to an inert organic solvent and add the molecular weight modifier described above, and after this add the component (A) and the component (B) in an arbitrary order.

(3) To add the component (A) to an inert organic solvent and add the component (C) and the molecular weight modifier described above in an arbitrary order, and after this add the component (B).

(4) To add the component (B) to an inert organic solvent and add the component (C) and the molecular weight modifier described above in an arbitrary order, and after this add the component (A).

(5) To add the component (C) to an inert organic solvent and add the component (A) and the component (B) in an arbitrary order, and after this add the molecular weight modifier described above.

Some of the components may be mixed and aged in advance. Particularly, it is preferable to mix and age the component (A) and the component (C) in advance.

The aging temperature is −50 to 80° C. and preferably −10 to 50° C. The aging time is 0.01 to 24 hours, preferably 0.05 to 5 hours, and particularly preferably 0.1 to 1 hour.

The catalyst obtained in the way described above can also be used as supported on an inorganic compound, an organic polymer compound, etc.

The polymerization solvent is not limited and may be, for example, aliphatic hydrocarbon such as butane, pentane, hexane, heptane, etc., alicyclic hydrocarbon such as cyclopentane, cyclohexane, etc., aromatic hydrocarbon such as benzene, toluene, xylene, ethylbenzene, etc., an olefinic hydrocarbon such as the olefin compound described above, cis-2-butene, trans-2-butene, etc. Particularly, benzene, toluene, cyclohexane, or a mixture of cis-2-butene and trans-2-butene, etc. is preferable. Bulk polymerization in which a monomer itself is used as the polymerization solvent may also be employed.

The concentration of the conjugated diene monomer in solution polymerization is preferably 5 to 70% by weight and particularly preferably 10 to 50% by weight.

The polymerization temperature according to the present invention is in the range of from 50 to 120° C., more preferably from 55 to 110° C., and particularly preferably from 60 to 100° C. The polymer will have a low degree of branching if the temperature is 50° C. or lower, and will contain a large amount of gel if the temperature is 120° C. or higher. The polymerization time is preferably 1 minute to 12 hours, and particularly preferably 5 minutes to 5 hours. The polymerization temperature and the polymerization time are adjusted as may be needed to impart an intended property to the polymer to be obtained.

Examples of conjugated dienes that can be polymerized include 1,3-butadiene, 2-methyl-1,3-butadiene (isoprene), 2,3-dimethyl-1,3-butadiene, 1,3-pentadiene (piperylene), 1,3-hexadiene, 1,3-cyclohexadiene, etc. These conjugated dienes may be used singly, or two or more kinds of conjugated dienes may be used in combination to obtain a copolymer. A preferable conjugated diene is 1,3-butadiene or isoprene.

When polymerizing a conjugated diene, it is possible to use hydrogen, a hydrogenated metal compound, or a hydrogenated organic metal compound as a molecular weight modifier. It is particularly preferable to modify molecular weights by using hydrogen.

The content of cis-1,4 structures in a branched conjugated diene polymer to be obtained according to the present invention is preferably 80% or higher and particularly preferably 90% or higher. The content of 1,2 structures in the branched conjugated diene polymer is preferably lower than 5% and particularly preferably lower than 3%.

A ratio ($T_{cp}/ML_{1+4}$) between a 5 wt % toluene solution viscosity ($T_{cp}$) of the polymer measured at 25° C. and a Mooney viscosity ($ML_{1+4}$) of the polymer at 100° C. is preferably 0.1 to 1.2, more preferably 0.2 to 1.1, and particularly preferably 0.4 to 1.0. The ratio $T_{cp}/ML_{1+4}$ is one of indicators of the degree of branching of a polymer. The smaller value the ratio takes, the higher the degree of branching is.

The Mooney viscosity ($ML_{1+4}$) of the polymer is preferably 10 to 80 and particularly preferably 20 to 70. The polymer has a poor property if the Mooney viscosity ($ML_{1+4}$) is too low, and has a poor workability if it is too high.

By polymerizing 1,3-butadiene according to the manufacturing method described above, it is possible to obtain polybutadiene having a high content of cis-1,4 structures and a high degree of branching.

The ratio ($T_{cp}/ML_{1+4}$) of the polybutadiene according to the present invention between its 5 wt % toluene solution viscosity ($T_{cp}$) measured at 25° C. and its Mooney viscosity ($ML_{1+4}$) at 100° C. which ratio is one of indicators of the degree of branching is preferably 0.1 to 1.0, more preferably 0.3 to 1.0, and particularly preferably 0.5 to 1.0. The ratio $T_{cp}/ML_{1+4}$ is one of indicators of the degree of branching of a polymer, and the smaller value the ratio takes, the higher the degree of branching is.

There is another indicator of the degree of branching; in a relationship between absolute molecular weight and average radius of gyration which are measured by GPC/MALLS method (gel filtration chromatography/multi-angle laser light scattering detection method), an average radius of gyration of molecules with respect to 300,000 g/mol is 30 to 20 nm, preferably 30 to 23 nm, and particularly preferably 30 to 25 nm, and an average radius of gyration of molecules with respect to 1,000,000 g/mol is 50 to 40 nm, preferably 50 to 43 nm, and particularly preferably 50 to 46 nm. In this case, the average radius of gyration of molecules with respect to 600,000 g/mol is 40 to 30 nm, preferably 40 to 33 nm, and particularly preferably 40 to 36 nm.

The content of cis-1,4 structures in the polybutadiene is preferably 80% or higher and particularly preferably 90% or higher. The content of 1,2 structures in the polybutadiene is preferably lower than 5% and particularly preferably lower than 3%.

A rubber composition according to the present invention contains the polybutadiene having the properties described above, at preferably 10% by weight or higher, more preferably 20% by weight or higher, and particularly preferably 30% by weight or higher. If the polybutadiene content is lower than 10% by weight, the effect of the present invention might not be obtained sufficiently.

The rubber composition according to the present invention may contain, in combination, another rubber component than the polybutadiene having the properties described above.

Another rubber component may be a general polybutadiene rubber other than the polybutadiene having the properties described above, styrene-butadiene rubber (SBR), natural rubber (NR), polyisoprene rubber (IR), ethylene-propylene-diene rubber (EPDM), nitrile rubber (NBR), butyl rubber, chloroprene rubber, etc. These rubbers may be modified, and modification by, for example, a tin compound, an epoxy compound, a silane compound, maleic acid, etc is possible. These rubbers may be used singly or two or more kinds of rubbers may be used in combination.

It is preferable that the rubber composition according to the present invention further contain a rubber reinforcing agent. Examples of reinforcing agents include inorganic reinforcing agents such as various types of carbon black and silica, activated calcium carbonate, ultrafine-particulate magnesium silicate, etc., organic reinforcing agents such as syndiotactic-1,2 polybutadiene, polyethylene resin, polypropylene resin, high-styrene resin, phenol resin, lignin, modified melamine resin, coumarone-indene resin, petroleum resin, etc. It is preferable to use silica and/or carbon black. When using silica, it is preferable to use a silane coupling agent which has a functional group that can react with a diene-based rubber such as bis(3-triethoxysilylpropyl)tetrasulfide, 3-trimethoxysilylpropylbenzothiazolyltetrasulfide, etc.

It is preferable that the rubber composition according to the present invention, when used for tires in particular, be a composition containing: a rubber component which consists of 10 to 90% by weight of polybutadiene (i) having the properties described above and 90 to 10% by weight of another rubber component (ii) than (i) and which has a total (i)+(ii) of 100 parts by weight; and 1 to 100 parts by weight of a rubber reinforcing agent (iii).

The rubber composition according to the present invention may also contain, as may be needed, any other agent that is used ordinarily such as a vulcanizing agent, a vulcanizing auxiliary, an antioxidant, a filler, a process oil, zinc white, stearic acid, etc.

The vulcanizing agent may be a publicly-known vulcanizing agent such as sulfur, organic peroxide, a resin vulcanizing agent, metal oxide such as magnesium oxide, etc. The vulcanizing auxiliary may be a publicly-known vulcanizing auxiliary such as aldehyde group, ammonia group, amine group, guanidine group, thiourea group, thiazole group, thiuram group, dithiocarbamate group, xanthate group, etc. The antioxidant may be amine-ketone series, imidazole series, amine series, phenol series, sulfur series, phosphorus series, etc. The filler may be an inorganic filler such as calcium carbonate, basic magnesium carbonate, clay, litharge, diatomaceous earth, etc. and an organic filler such as reclaimed rubber, powder rubber, etc. The process oil may be any of aromatic series, naphthene series, and paraffin series.

The rubber composition according to the present invention is obtained by mixing the components described above by, as is normally practiced, using a Banbury mixer, an open roll, a kneader, a twin-screw mixer etc., and can be used as various rubber products by being vulcanized after it is shaped. For example, it can be used for such applications as members of tires including treads, carcasses, side walls, beads, etc., anti-vibration rubbers, fenders, belts, hoses, and other industrial products, golf balls, shoe soles, etc.

EXAMPLES

Examples based on the present invention will be described below specifically. Measuring methods were as follows.

(1) Mooney viscosity ($ML_{1+4}$): this was measured at 100° C. according to JIS K 6300.

(2) 5 wt % toluene solution viscosity ($T_{cp}$): the viscosity of a 5 wt % toluene solution at 25° C. was measured.

(3) Microstructure: this was measured by infrared absorption spectrum analysis. A microstructure was calculated from the absorption intensity ratio at cis 740 cm$^{-1}$, trans 967 cm$^{-1}$, vinyl 910 cm$^{-1}$.

(4) Intrinsic viscosity ([η]): this was measured at 30° C. by using a toluene solution.

(5) Weight-average molecular weight ($M_w$), number average molecular weight ($M_n$), and molecular weight distribution ($M_w/M_n$): these were obtained as standard polystyrene-equivalent values, based on a dissolution curve of the polymer measured by GPC (columns: Shodex KF-805L×2 columns) at 40° C. using tetrahydrofuran as a solvent.

(6) Measurement of absolute molecular weight and average radius of gyration by GPC/MALLS method (gel filtration chromatography/multi-angle laser light scattering detection method): this was carried out by GPC (columns: TSKgel GMH$_{HR}$-H×1 column, and TSKgel GMH$_{XL}$×1 column) at 40° C. using tetrahydrofuran as a solvent and using DAWN EOS provided by Wyatt Technology as a multi-angle light scattering detector.

(7) Strain dependence (Payne effect) of storage elastic modulus (G'): a dynamic strain analysis was conducted by using a rubber workability analyzer RPA-2000 provided by Alpha Technologies under the conditions that the temperature was 120° C. and the frequency was 1 Hz. Payne effect was expressed as a difference ΔG' between G' when strain was 0.5% and G' when strain was 10%, with respect to Comparative Example 7 (BR150L) of which ΔG' was defined as 100. The smaller the difference ΔG', the better the dispersibility of a reinforcing agent.

(8) Hardness: this was measured according to a measuring method prescribed by JIS K6253.

(9) Tensile strength: this was measured according to a measuring method prescribed by JIS K6251. At the same time, tensile stresses at 100% elongation and 300% elongation (M100 and M300) were also measured.

(10) Calorific properties: calorific value (ΔT) and permanent strain (PS) were measured according to JIS K6252 by using a Good Rich flexometer under the conditions that the temperature was 100° C., a strain was 0.175 inch, a load was 55 pounds, a frequency was 1,800 times per minute.

(11) Abrasion resistance: this was measured according to Lambourn abrasion measuring method prescribed by JIS K6264 at a slip ratio of 60%, and expressed with respect to Comparative Example 7 (BR150L) of which abrasion resistance was defined as 100.

(12) Low loss property: this was measured by using a solid viscoelasticity measuring device provided by GABO in a temperature range of from −120° C. to 100° C. at a frequency of 10 Hz, and at a dynamic strain of 0.3%, and a loss tangent (tan δ) at 50° C. was calculated. The smaller the loss tangent (tan δ), the better the low loss property.

Example 1

An autoclave having an internal capacity of 1.5 L was purged with nitrogen, a solution consisting of 390 ml of toluene and 210 ml of butadiene was poured into the autoclave, and the temperature of the solution was set to 30° C. After this, 1.5 ml of a cyclohexane solution including triethyl aluminum (TEA) (2 mol/L) was added, and the resulting solution was stirred for three minutes at 500 rpm. Next, 0.15 ml of a toluene solution including yttrium (III) tris (2,2,6,6-tetramethyl-3,5-heptanedioate) (0.05 mol/L) was added, and the resulting solution was heated to 40° C. Then, the solution was stirred for two minutes. After this, 3.75 ml of a toluene solution including triphenylcarbeniumtetrakis (pentafluorophenyl)borate (0.004 mol/L) was added, and the resulting solution was elevated to 80° C. Then, the solution was polymerized at 80° C. for 15 minutes. After this, 3 ml of an ethanol solution containing an antioxidant was added to stop polymerization. After pressure discharge was carried out in the autoclave, the polymerized solution was fed to ethanol, and polybutadiene was collected. Then, the collected polybutadiene was dried at 80° C. for three hours in a vacuum. The result of polymerization is shown in Table 1.

Example 2

An autoclave having an internal capacity of 1.5 L was purged with nitrogen, a solution consisting of 650 ml of toluene and 350 ml of butadiene was poured into the autoclave, and the temperature of the solution was set to 30° C. After this, 5.63 ml of a cyclohexane solution including triethyl aluminum (TEA) (2 mol/L) was added, and the resulting solution was stirred for three minutes at 500 rpm. Next, 0.25 ml of a toluene solution including yttrium (III) tris (2,2,6,6-tetramethyl-3,5-heptanedioate) (0.05 mol/L) was added, and the resulting solution was heated to 40° C. Then, the solution was stirred for two minutes. After this, 6.25 ml of a toluene solution including triphenylcarbeniumtetrakis (pentafluorophenyl)borate (0.004 mol/L) was added, and the resulting solution was elevated to 80° C. Then, the solution was polymerized at 80° C. for 15 minutes. After this, 10 ml of an ethanol solution containing an antioxidant was added to stop polymerization. After pressure discharge was carried out in the autoclave, the polymerized solution was fed to ethanol, and polybutadiene was collected. Then, the collected polybutadiene was dried at 80° C. for three hours in a vacuum. The result of polymerization is shown in Table 1.

Example 3

Polymerization was promoted under the same conditions as Example 1, except that a cyclohexane solution including triethyl aluminum (TEA) (2 mol/L) was 6.25 ml. The result of polymerization is shown in Table 1.

Example 4

Polymerization was promoted under the same conditions as Example 1, except that a cyclohexane solution including triethyl aluminum (TEA) (2 mol/L) was 6.88 ml. The result of polymerization is shown in Table 1.

Example 5

An autoclave having an internal capacity of 1.5 L was purged with nitrogen, a solution consisting of 390 ml of toluene and 210 ml of butadiene was poured into the autoclave, and the temperature of the solution was set to 30° C. After this, 3.0 ml of a cyclohexane solution including triethyl aluminum (TEA) (2 mol/L) was added, and the resulting solution was stirred for three minutes at 500 rpm. Next, 0.15 ml of a toluene solution including yttrium (III) tris (2,2,6,6-tetramethyl-3,5-heptanedioate) (0.05 mol/L) was added, and the resulting solution was heated to 40° C. Then, the solution was stirred for two minutes. After this, 3.75 ml of a toluene solution including triphenylcarbeniumtetrakis (pentafluorophenyl)borate (0.004 mol/L) was added, and the resulting solution was elevated to 60° C. Then, the solution was polymerized at 60° C. for 25 minutes. After this, 3 ml of an ethanol solution containing an antioxidant was added to stop polymerization. After pressure discharge was carried out in the autoclave, the polymerized solution was fed to ethanol, and polybutadiene was collected. Then, the collected polybutadiene was dried at 80° C. for three hours in a vacuum. The result of polymerization is shown in Table 1.

Example 6

Polymerization was promoted under the same conditions as Example 5, except that a cyclohexane solution including triethyl aluminum (TEA) (2 mol/L) was 3.75 ml. The result of polymerization is shown in Table 1.

Example 7

An autoclave having an internal capacity of 1.5 L was purged with nitrogen, and a solution consisting of 390 ml of toluene and 210 ml of butadiene was poured into the autoclave. Then, a hydrogen gas having 0.04 MPa/cm$^2$ was added. After the temperature of the solution was set to 30° C., 1.5 ml of a cyclohexane solution including triethyl aluminum (TEA) (2 mol/L) was added, and the resulting solution was stirred for three minutes at 500 rpm. Next, 0.15 ml of a toluene solution including yttrium (III) tris (2,2,6,6-tetramethyl-3,5-heptanedioate) (0.05 mol/L) was added, and the resulting solution was heated to 40° C. Then, the solution was stirred for two minutes. After this, 3.75 ml of a toluene solution including triphenylcarbeniumtetrakis (pentafluorophenyl)borate (0.004 mol/L) was added, and the resulting solution was elevated to 60° C. Then, the solution was polymerized at 60° C. for 25 minutes. After this, 3 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 1.

Example 8

Polymerization was promoted under the same conditions as Example 7, except that the pressure of a hydrogen gas was 0.06 MPa/cm$^2$. The result of polymerization is shown in Table 1.

Example 9

Polymerization was promoted under the same conditions as Example 7, except that the pressure of a hydrogen gas was 0.08 MPa/cm$^2$. The result of polymerization is shown in Table 1.

Comparative Example 1

An autoclave having an internal capacity of 1.5 L was purged with nitrogen, a solution consisting of 390 ml of toluene and 210 ml of butadiene was poured into the autoclave, and the temperature of the solution was set to 30° C. After this, 1.5 ml of a cyclohexane solution including triethyl aluminum (TEA) (2 mol/L) was added, and the resulting solution was stirred for three minutes at 500 rpm. Next, 0.15 ml of a toluene solution including yttrium (III) tris (2,2,6,6-tetramethyl-3,5-heptanedioate) (0.05 mol/L) was added, and the resulting solution was heated to 40° C. Then, the solution was stirred for two minutes. After this, 3.75 ml of a toluene solution including triphenylcarbeniumtetrakis (pentafluorophenyl)borate (0.004 mol/L) was added, and polymerization was started. After polymerization was promoted at 40° C. for 15 minutes, 3 ml of an ethanol solution containing an antioxidant was added to stop polymerization. Then, ethanol was fed to the polymerized solution. After this, pressure discharge was carried out in the autoclave, and polybutadiene was collected. Then, the collected polybutadiene was dried at 80° C. for three hours in a vacuum. The result of polymerization is shown in Table 1.

Comparative Example 2

An autoclave having an internal capacity of 1.5 L was purged with nitrogen, a solution consisting of 390 ml of toluene and 210 ml of butadiene was poured into the autoclave, and the temperature of the solution was set to 30° C. After this, 4.0 ml of a cyclohexane solution including triethyl aluminum (TEA) (2 mol/L) was added, and the resulting solution was stirred for three minutes at 500 rpm. Next, 0.8 ml of a toluene solution including yttrium (III) tris (2,2,6,6-tetramethyl-3,5-heptanedioate) (0.05 mol/L) was added, and the resulting solution was heated to 40° C. Then, the solution was stirred for two minutes. After this, 0.185 ml of a toluene solution including triphenylcarbeniumtetrakis (pentafluorophenyl)borate (0.43 mol/L) was added, and polymerization was started. After polymerization was promoted at 40° C. for 30 minutes, 3 ml of an ethanol solution containing an antioxidant was added to stop polymerization. Then, ethanol was fed to the polymerized solution. After this, pressure discharge was carried out in the autoclave, and polybutadiene was collected. Then, the collected polybutadiene was dried at 80° C. for three hours in a vacuum. The result of polymerization is shown in Table 1.

Example 10

An autoclave having an internal capacity of 1.5 L was purged with nitrogen, and a solution consisting of 390 ml of toluene and 210 ml of butadiene was poured into the autoclave. Then, a hydrogen gas having 0.06 MPa/cm$^2$ was added. After the temperature of the solution was set to 30° C., 1.5 ml of a cyclohexane solution including triethyl aluminum (TEA) (2 mol/L) was added, and the resulting solution was stirred for three minutes at 500 rpm. Next, 0.15 ml of a toluene solution including yttrium (III) tris (2,2,6,6-tetramethyl-3,5-heptanedioate) (0.05 mol/L) was added, and the resulting solution was heated to 40° C. Then, the solution was stirred for two minutes. After this, 3.75 ml of a toluene solution including triphenylcarbeniumtetrakis (pentafluorophenyl)borate (0.004 mol/L) was added, and the resulting solution was elevated to 60° C. Then, the solution was polymerized at 60° C. for 25 minutes. After this, 3 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 2.

Example 11

Polymerization was promoted under the same conditions as Example 10, except that the pressure of a hydrogen gas was 0.04 MPa/cm$^2$. The result of polymerization is shown in Table 2.

Example 12

Polymerization was promoted under the same conditions as Example 10, except that the pressure of a hydrogen gas was 0.08 MPa/cm². The result of polymerization is shown in Table 2.

Example 13

An autoclave having an internal capacity of 1.5 L was purged with nitrogen, and a solution consisting of 390 ml of toluene and 210 ml of butadiene was poured into the autoclave. Then, a hydrogen gas having 0.06 MPa/cm² was added. After the temperature of the solution was set to 30° C., 1.5 ml of a cyclohexane solution including triethyl aluminum (TEA) (2 mol/L) was added, and the resulting solution was stirred for three minutes at 500 rpm. Next, 0.15 ml of a toluene solution including yttrium (III) tris (2,2,6,6-tetramethyl-3,5-heptanedioate) (0.05 mol/L) was added, and the resulting solution was heated to 40° C. Then, the solution was stirred for two minutes. After this, 3.75 ml of a toluene solution including triphenylcarbeniumtetrakis (pentafluorophenyl)borate (0.004 mol/L) was added, and the resulting solution was elevated to 80° C. Then, the solution was polymerized at 80° C. for 15 minutes. After this, 3 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 2.

Example 14

Polymerization was promoted under the same conditions as Example 13, except that the pressure of a hydrogen gas was 0.04 MPa/cm². The result of polymerization is shown in Table 2.

Example 15

Polymerization was promoted under the same conditions as Example 13, except that the pressure of a hydrogen gas was 0.08 MPa/cm². The result of polymerization is shown in Table 2.

Example 16

An autoclave having an internal capacity of 1.5 L was purged with nitrogen, and a solution consisting of 390 ml of toluene and 210 ml of butadiene was poured into the autoclave. Then, a hydrogen gas having 0.08 MPa/cm² was added. After the temperature of the solution was set to 30° C., 1.25 ml of a cyclohexane solution including triethyl aluminum (TEA) (2 mol/L) was added, and the resulting solution was stirred for three minutes at 500 rpm. Next, 0.2 ml of a toluene solution including yttrium (III) tris (2,2,6,6-tetramethyl-3,5-heptanedioate) (0.05 mol/L) was added, and the resulting solution was heated to 40° C. Then, the solution was stirred for two minutes. After this, 5.0 ml of a toluene solution including triphenylcarbeniumtetrakis (pentafluorophenyl)borate (0.004 mol/L) was added, and resulting solution was elevated to 80° C. Then, the solution was polymerized at 80° C. for 15 minutes. After this, 3 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 2.

Example 17

An autoclave having an internal capacity of 1.5 L was purged with nitrogen, and a solution consisting of 390 ml of toluene and 210 ml of butadiene was poured into the autoclave. Then, a hydrogen gas having 0.08 MPa/cm² was added. After the temperature of the solution was set to 30° C., 1.0 ml of a cyclohexane solution including triethyl aluminum (TEA) (2 mol/L) was added, and the resulting solution was stirred for three minutes at 500 rpm. Next, 0.3 ml of a toluene solution including yttrium (III) tris (2,2,6,6-tetramethyl-3,5-heptanedioate) (0.05 mol/L) was added, and the resulting solution was heated to 40° C. Then, the solution was stirred for two minutes. After this, 0.07 ml of a toluene solution including triphenylcarbeniumtetrakis (pentafluorophenyl)borate (0.43 mol/L) was added, and the resulting solution was elevated to 80° C. Then, the solution was polymerized at 80° C. for 15 minutes. After this, 3 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 2.

Example 18

Polymerization was promoted under the same conditions as Example 16, except that the pressure of a hydrogen gas was 0.06 MPa/cm². The result of polymerization is shown in Table 2.

Example 19

An autoclave having an internal capacity of 1.5 L was purged with nitrogen, and a solution consisting of 390 ml of toluene and 210 ml of butadiene was poured into the autoclave. Then, a hydrogen gas having 0.08 MPa/cm² was added. After the temperature of the solution was set to 30° C., 1.25 ml of a cyclohexane solution including triethyl aluminum (TEA) (2 mol/L) was added, and the resulting solution was stirred for three minutes at 500 rpm. Next, 0.2 ml of a toluene solution including yttrium (III) tris (2,2,6,6-tetramethyl-3,5-heptanedioate) (0.05 mol/L) was added, and the resulting solution was stirred at 30° C. for 30 minutes and then heated to 40° C. Then, the solution was stirred for two minutes. After this, 5.0 ml of a toluene solution including triphenylcarbeniumtetrakis (pentafluorophenyl)borate (0.004 mol/L) was added, and the resulting solution was elevated to 80° C. Then, the solution was polymerized at 80° C. for 15 minutes. After this, 3 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 2.

Example 20

An autoclave having an internal capacity of 1.5 L was purged with nitrogen, and a solution consisting of 390 ml of toluene and 210 ml of butadiene was poured into the autoclave. Then, a hydrogen gas having 0.06 MPa/cm² was added.

After the temperature of the solution was set to 30° C., 1.5 ml of a cyclohexane solution including triethyl aluminum (TEA) (2 mol/L) was added, and the resulting solution was stirred for three minutes at 500 rpm. Next, 0.1 ml of a toluene solution including yttrium (III) tris (2,2,6,6-tetramethyl-3,5-heptanedioate) (0.05 mol/L) was added, and the resulting solution was heated to 40° C. Then, the solution was stirred for two minutes. After this, 2.5 ml of a toluene solution including triphenylcarbeniumtetrakis (pentafluorophenyl)borate (0.004 mol/L) was added, and the resulting solution was elevated to 80° C. Then, the solution was polymerized at 80° C. for 15 minutes. After this, 3 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 2.

Example 21

An autoclave having an internal capacity of 1.5 L was purged with nitrogen, and a solution consisting of 300 ml of toluene and 300 ml of butadiene was poured into the autoclave. Then, a hydrogen gas having 0.06 MPa/cm² was added. After the temperature of the solution was set to 30° C., 1.5 ml of a cyclohexane solution including triethyl aluminum (TEA) (2 mol/L) was added, and the resulting solution was stirred for three minutes at 500 rpm. Next, 0.15 ml of a toluene solution including yttrium (III) tris (2,2,6,6-tetramethyl-3,5-heptanedioate) (0.05 mol/L) was added, and the resulting solution was heated to 40° C. Then, the solution was stirred for two minutes. After this, 3.75 ml of a toluene solution including triphenylcarbeniumtetrakis (pentafluorophenyl)borate (0.004 mol/L) was added, and the resulting solution was elevated to 80° C. Then, the solution was polymerized at 80° C. for 15 minutes. After this, 3 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 2.

Example 22

Polymerization was promoted under the same conditions as Example 21, except that a cyclohexane solution including triethyl aluminum (TEA) (2 mo/L) was 2.25 ml. The result of polymerization is shown in Table 2.

Example 23

Polymerization was promoted under the same conditions as Example 21, except that toluene was 350 ml and butadiene was 250 ml. The result of polymerization is shown in Table 2.

Example 24

Polymerization was promoted under the same conditions as Example 21, except that the pressure of a hydrogen gas was 0.07 MPa/cm². The result of polymerization is shown in Table 2.

Example 25

An autoclave having an internal capacity of 1.5 L was purged with nitrogen, and a solution consisting of 350 ml of toluene and 250 ml of butadiene was poured into the autoclave. After the temperature of the solution was set to 30° C., 1.5 ml of a cyclohexane solution including triethyl aluminum (TEA) (2 mol/L) was added, and the resulting solution was stirred for three minutes at 500 rpm. Next, 0.15 ml of a toluene solution including yttrium (III) tris (2,2,6,6-tetramethyl-3,5-heptanedioate) was added, and the resulting solution was heated to 40° C. Then, the solution was stirred for two minutes. After this, 3.75 ml of a toluene solution including triphenylcarbeniumtetrakis (pentafluorophenyl)borate (0.004 mol/L) was added, and the resulting solution was elevated to 80° C. At the timing when 7.5 minutes passed after polymerization at 80° C. was started, a hydrogen gas having 0.08 MPa/cm² was added, and polymerization was further promoted for 7.5 minutes. Then, 3 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 2.

Example 26

Polymerization was promoted under the same conditions as Example 25, except that the pressure of a hydrogen gas was 0.06 MPa/cm². The result of polymerization is shown in Table 2.

Example 27

Polymerization was promoted under the same conditions as Example 25, except that the timing to add a hydrogen gas was five minutes after polymerization was started and the polymerization time after the addition was 10 minutes. The result of polymerization is shown in Table 2.

Example 28

Polymerization was promoted under the same conditions as Example 25, except that the timing to add a hydrogen gas was 2.5 minutes after polymerization was started and the polymerization time after the addition was 2.5 minutes. The result of polymerization is shown in Table 2.

Example 29

Polymerization was promoted under the same conditions as Example 25, except that the timing to add a hydrogen gas was four minutes after polymerization was started and the polymerization time after the addition was 11 minutes. The result of polymerization is shown in Table 2.

Example 30

An autoclave having an internal capacity of 1.5 L was purged with nitrogen, and a solution consisting of 580 ml of toluene and 420 ml of butadiene was poured into the autoclave. Then, a hydrogen gas having 0.1 MPa/cm² was added. After the temperature of the solution was set to 30° C., 1.5 ml of a cyclohexane solution including triethyl aluminum (TEA) (2 mol/L) was added, and the resulting solution was stirred for three minutes at 500 rpm. Next, 0.25 ml of a toluene solution including yttrium (III) tris (2,2,6,6-tetramethyl-3,5-heptanedioate) (0.05 mol/L) was added, and the resulting solution was heated to 40° C. Then, the solution was stirred for two minutes. After this, 0.06 ml of a toluene solution including triphenylcarbeniumtetrakis (pentafluorophenyl)borate (0.43 mol/L) was added, and the resulting solution was elevated to 80° C. Then, the solution was polymerized at 80° C. for 15 minutes. After this, 5 ml of an ethanol solution containing an antioxidant was added to stop polymerization. After pressure discharge was carried out in the autoclave, the polymerized solution was taken out from the autoclave, and polybutadiene was collected. Then, the collected polybutadiene was dried at 80° C. for three hours in a vacuum. The result of polymerization is shown in Table 2.

Example 31

Polymerization was promoted under the same conditions as Example 30, except that the pressure of a hydrogen gas was 0.15 MPa/cm². The result of polymerization is shown in Table 2.

Example 32

An autoclave having an internal capacity of 1.51 L was purged with nitrogen, and a solution consisting of 390 ml of toluene and 210 ml of butadiene was poured into the autoclave. Then, a hydrogen gas having 0.03 Mpa/cm² was added. After the temperature of the solution was set to 30° C., 1.25 ml of a cyclohexane solution including triethyl aluminum (TEA) (2 mol/L) was added, and the resulting solution was stirred for three minutes at 500 rpm. Next, 0.15 ml of a toluene solution including yttrium (III) tris (2,2,6,6-tetramethyl-3,5-heptanedioate) (0.05 mol/L) was added, and the resulting solution was heated to 40° C. Then, the solution was stirred for two minutes. After this, 3.75 ml of a toluene solution including triphenylcarbeniumtetrakis (pentafluorophenyl) borate (0.004 mol/L) was added, and the resulting solution was elevated to 60° C. Then, the solution was polymerized at 60° C. for 30 minutes. After this, 3 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 2. The result of measurement by GPC/MALLS is also shown in Table 3.

Example 33

An autoclave having an internal capacity of 1.51 L was purged with nitrogen, and a solution consisting of 390 ml of toluene and 210 ml of butadiene was poured into the autoclave. Then, a hydrogen gas having 0.03 MPa/cm² was added. After the temperature of the solution was set to 30° C., 1.25 ml of a cyclohexane solution including methyl aluminum (TEA) (2 mol/L) was added, and the resulting solution was stirred for three minutes at 500 rpm, Next, 0.15 ml of a toluene solution including yttrium (III) tris (2,2,6,6-tetramethyl-3,5-heptanedioate) (0.05 mol/L) was added, and the resulting solution was heated to 40° C. Then, the solution was stirred for two minutes. After this, 3.75 ml of a toluene solution including riphenylcarbeniumtetrakis (pentafluorophenyl) borate (0.004 mol/L) was added, and the resulting solution was elevated to 80° C. Then, the solution was polymerized at 80° C. for 15 minutes. After this, 3 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 2. The result of measurement. by GPC/MALLS is also shown in Table 3.

Comparative Example 3

An autoclave having an internal capacity of 1.5 L was purged with nitrogen, and a solution consisting of 390 ml of toluene and 210 ml of butadiene was poured into the autoclave. Then, a hydrogen gas having 0.04 MPa/cm² was added. After the temperature of the solution was set to 30° C., 1.5 ml of a cyclohexane solution including triethyl aluminum (TEA) (2 mol/L) was added, and the resulting solution was stirred for three minutes at 500 rpm. Next, 0.6 ml of a toluene solution including yttrium (III) tris (2,2,6,6-tetramethyl-3,5-heptanedioate) (0.05 mol/L) was added, and the resulting solution was heated to 40° C. Then, the solution was stirred for two minutes. After this, 0.14 ml of a toluene solution including triphenylcarbeniumtetrakis (pentafluorophenyl)borate (0.43 mol/L) was added. Then, the resulting solution was polymerized at 40° C. for 25 minutes. After this, 3 ml of an ethanol solution containing an antioxidant was added to stop polymerization. After pressure discharge was carried out in the autoclave, ethanol was fed to the polymerized solution, and polybutadiene was collected. Then, the collected polybutadiene was dried at 80° C. for three hours in a vacuum. The result of polymerization is shown in Table 2.

Comparative Example 4

Polymerization was promoted under the same conditions as Comparative Example 3, except that the pressure of a hydrogen gas was 0.06 MPa/cm². The result of polymerization is shown in Table 2.

Comparative Example 5

Absolute molecular weight and average radius of gyration of a polybutadiene rubber BR150L provided by Ube Industries, Ltd. were measured by GPC/MALLS. The result of measurement is shown in Table 3.

Comparative Example 6

Absolute molecular weight and average radius of gyration of a polybutadiene rubber BR150B provided by Ube Industries, Ltd. were measured by GPC/MALLS. The result of measurement is shown in Table 3.

TABLE 1

| | Polymerization Temperature (° C.) | Polymerization Time (min) | Hydrogen Pressure (kgf/cm²) | Al/Y | Productivity (g·mmol$^{-1}$-Y·h$^{-1}$) | $ML_{1+4}$ (100° C.) | [η] | Tcp (cps) | Tcp/ML | 1,4-trans | 1,2-vinyl | 1,4-cis | Mn/$10^4$ | Mw/$10^4$ | Mw/Mn |
|---|---|---|---|---|---|---|---|---|---|---|---|---|---|---|---|
| Example 1 | 80 | 15 | 0.0 | 400 | 31300 | 102 | 2.8 | 121.8 | 1.19 | 8.0 | 2.0 | 90.1 | 17.1 | 115.7 | 6.8 |
| Example 2 | 80 | 15 | 0.0 | 900 | 35300 | 63 | 1.8 | 29.9 | 0.47 | 13.1 | 2.1 | 84.8 | 9.4 | 69.1 | 7.3 |
| Example 3 | 80 | 15 | 0.0 | 1000 | 35300 | 54 | 1.6 | 24.0 | 0.44 | 13.8 | 2.1 | 84.1 | 9.7 | 69.0 | 7.1 |

TABLE 1-continued

|  | Polymerization Temperature (° C.) | Polymerization Time (min) | Hydrogen Pressure (kgf/cm²) | Al/Y | Productivity (g·mmol⁻¹–Y·h⁻¹) | $ML_{1+4}$ (100° C.) | $[\eta]$ | Tcp (cps) | Tcp/ML | 1,4-trans | 1,2-vinyl | 1,4-cis | Mn/10⁴ | Mw/10⁴ | Mw/Mn |
|---|---|---|---|---|---|---|---|---|---|---|---|---|---|---|---|
| Example 4 | 80 | 15 | 0.0 | 1100 | 33800 | 48 | 1.6 | 20.8 | 0.43 | 14.4 | 2.1 | 83.5 | 9.8 | 54.7 | 5.6 |
| Example 5 | 60 | 25 | 0.0 | 800 | 14900 | 61 | 2.1 | 47.3 | 0.77 | 7.4 | 1.5 | 91.1 | 15.2 | 74.4 | 4.9 |
| Example 6 | 60 | 25 | 0.0 | 1000 | 13700 | 41 | 1.7 | 28.6 | 0.70 | 8.4 | 1.6 | 90.1 | 13.0 | 57.5 | 4.4 |
| Example 7 | 60 | 25 | 0.4 | 400 | 11300 | 40 | 1.8 | 37.0 | 0.94 | 4.5 | 1.5 | 93.9 | 15.0 | 47.6 | 3.2 |
| Example 8 | 60 | 25 | 0.6 | 400 | 11200 | 24 | 1.5 | 21.6 | 0.88 | 4.6 | 1.5 | 93.9 | 12.6 | 35.8 | 2.8 |
| Example 9 | 60 | 25 | 0.8 | 400 | 11000 | 17 | 1.4 | 14.9 | 0.90 | 4.6 | 1.6 | 93.8 | 11.3 | 29.3 | 2.6 |
| Comparative Example 1 | 40 | 15 | 0.0 | 400 | 1360 | — | 1.5 | — | — | 2.7 | 1.0 | 96.3 | 14.6 | 31.8 | 2.2 |
| Comparative Example 2 | 40 | 30 | 0.0 | 200 | 1860 | 52 | 2.4 | 121.8 | 2.34 | 3.2 | 0.8 | 95.9 | 18.7 | 59.8 | 3.2 |

TABLE 2

| Example | Butadiene Concentration (wt %) | Al/Y | B/Y | Hydrogen Pressure (kgf/cm²) | Polymerization Temperature (° C.) | Polymerization Time (min) | Activity (g·mmol⁻¹–Y·h⁻¹) |
|---|---|---|---|---|---|---|---|
| Example 10 | 28 | 400 | 2.0 | 0.6 | 60 | 25 | 11200 |
| Example 11 | 28 | 400 | 2.0 | 0.4 | 60 | 25 | 11300 |
| Example 12 | 28 | 400 | 2.0 | 0.8 | 60 | 25 | 11000 |
| Example 13 | 28 | 400 | 2.0 | 0.6 | 80 | 15 | 23100 |
| Example 14 | 28 | 400 | 2.0 | 0.4 | 80 | 15 | 23600 |
| Example 15 | 28 | 400 | 2.0 | 0.8 | 80 | 15 | 20600 |
| Example 16 | 28 | 250 | 2.0 | 0.8 | 80 | 15 | 23300 |
| Example 17 | 28 | 133 | 2.0 | 0.8 | 80 | 15 | 15100 |
| Example 18 | 28 | 250 | 2.0 | 0.6 | 80 | 15 | 23700 |
| Example 19 | 28 | 250 | 2.0 | 0.8 | 80 | 15 | 21000 |
| Example 20 | 28 | 500 | 2.0 | 0.6 | 80 | 15 | 22100 |
| Example 21 | 41 | 400 | 2.0 | 0.6 | 80 | 15 | 23000 |
| Example 22 | 41 | 600 | 2.0 | 0.6 | 80 | 15 | 30500 |
| Example 23 | 34 | 400 | 2.0 | 0.6 | 80 | 15 | 24300 |
| Example 24 | 41 | 400 | 2.0 | 0.7 | 80 | 15 | 23100 |
| Example 25 | 34 | 400 | 2.0 | 0.0→0.8 | 80 | 15 | 26600 |
| Example 26 | 34 | 400 | 2.0 | 0.0→0.6 | 80 | 15 | 24300 |
| Example 27 | 34 | 400 | 2.0 | 0.0→0.8 | 80 | 15 | 27400 |
| Example 28 | 34 | 400 | 2.0 | 0.0→0.8 | 80 | 15 | 25600 |
| Example 29 | 34 | 400 | 2.0 | 0.0→0.8 | 80 | 15 | 25100 |
| Example 30 | 34 | 400 | 2.0 | 1.0 | 80 | 15 | 34100 |
| Example 31 | 34 | 400 | 2.0 | 1.5 | 80 | 15 | 33200 |
| Example 32 | 28 | 333 | 2.0 | 0.3 | 60 | 30 | 10500 |
| Example 33 | 28 | 333 | 2.0 | 0.3 | 80 | 15 | 22400 |
| Comparative Example 3 | 28 | 100 | 2.0 | 0.4 | 40 | 25 | 3370 |
| Comparative Example 4 | 28 | 100 | 2.0 | 0.6 | 40 | 25 | 3290 |

| Example | $ML_{1+4}$ (100° C.) | $[\eta]$ | Tcp (cps) | Tcp/ML | 1,4-trans | 1,2-vinyl | 1,4-cis | Mn/10⁴ | Mw/10⁴ | Mw/Mn |
|---|---|---|---|---|---|---|---|---|---|---|
| Example 10 | 24 | 1.5 | 21.6 | 0.88 | 4.6 | 1.5 | 93.9 | 12.6 | 35.8 | 2.8 |
| Example 11 | 40 | 1.8 | 37.0 | 0.94 | 4.5 | 1.5 | 93.9 | 15.0 | 47.6 | 3.2 |
| Example 12 | 17 | 1.4 | 14.9 | 0.90 | 4.6 | 1.6 | 93.8 | 11.3 | 29.3 | 2.6 |
| Example 13 | 23 | 1.3 | 13.8 | 0.59 | 7.5 | 2.1 | 90.5 | 10.4 | 32.7 | 3.1 |
| Example 14 | 40 | 1.6 | 21.1 | 0.53 | 7.5 | 2.1 | 90.4 | 12.1 | 43.7 | 3.6 |
| Example 15 | 17 | 1.2 | 10.1 | 0.61 | 7.2 | 2.1 | 90.7 | 9.4 | 26.3 | 2.8 |
| Example 16 | 15 | 1.2 | 9.2 | 0.61 | 7.4 | 2.1 | 90.5 | 9.8 | 28.4 | 2.9 |
| Example 17 | 19 | 1.3 | 12.2 | 0.66 | 7.1 | 2.4 | 90.5 | 10.3 | 33.8 | 3.3 |
| Example 18 | 27 | 1.4 | 15.5 | 0.57 | 7.6 | 2.2 | 90.3 | 11.9 | 39.1 | 3.3 |
| Example 19 | 19 | 1.2 | 11.4 | 0.61 | 7.0 | 2.3 | 90.7 | 10.7 | 31.2 | 2.9 |
| Example 20 | 25 | 1.3 | 13.2 | 0.53 | 7.1 | 2.0 | 90.9 | 11.8 | 33.5 | 2.8 |
| Example 21 | 47 | 1.9 | 43.8 | 0.93 | 5.0 | 2.1 | 92.9 | 16.4 | 56.2 | 3.4 |
| Example 22 | 34 | 1.6 | 25.9 | 0.76 | 6.0 | 2.1 | 91.9 | 13.5 | 46.1 | 3.4 |
| Example 23 | 34 | 1.6 | 23.7 | 0.69 | 5.9 | 2.2 | 92.0 | 13.3 | 42.4 | 3.2 |
| Example 24 | 41 | 1.8 | 37.8 | 0.93 | 4.7 | 2.2 | 93.1 | 15.3 | 51.5 | 3.4 |
| Example 25 | 76 | 2.3 | 65.9 | 0.86 | 6.4 | 2.1 | 91.5 | 17.3 | 78.7 | 4.5 |
| Example 26 | 81 | 2.3 | 70.3 | 0.87 | 6.0 | 2.0 | 91.9 | 16.2 | 76.6 | 4.7 |
| Example 27 | 66 | 2.0 | 45.6 | 0.69 | 6.4 | 2.1 | 91.4 | 16.3 | 74.8 | 4.6 |

TABLE 2-continued

| | | | | | | | | | | |
|---|---|---|---|---|---|---|---|---|---|---|
| Example 28 | 30 | 1.5 | 20.9 | 0.70 | 6.4 | 2.1 | 91.5 | 12.4 | 44.1 | 3.5 |
| Example 29 | 49 | 1.8 | 32.1 | 0.65 | 6.2 | 2.1 | 91.7 | 14.0 | 57.4 | 4.1 |
| Example 30 | 22 | 1.4 | 14.6 | 0.68 | 6.3 | 2.2 | 91.5 | 11.3 | 34.9 | 3.1 |
| Example 31 | 10 | 1.1 | 8.0 | 0.80 | 6.2 | 2.1 | 91.7 | 9.1 | 25.3 | 2.8 |
| Example 32 | 46 | 2.0 | 45.0 | 0.98 | 4.4 | 1.5 | 94.1 | 15.1 | 51.9 | 3.4 |
| Example 33 | 54 | 1.7 | 29.8 | 0.55 | 7.0 | 2.1 | 90.9 | 13.0 | 49.6 | 3.8 |
| Comparative Example 3 | 54 | 2.3 | 99.7 | 1.84 | 3.1 | 0.9 | 96.0 | 22.5 | 66.4 | 2.9 |
| Comparative Example 4 | 44 | 2.2 | 75.7 | 1.71 | 2.9 | 0.9 | 96.2 | 20.4 | 60.0 | 2.9 |

TABLE 3

| Example | 1,4-trans | 1,2-vinyl | 1,4-cis | $Mn/10^4$ | $Mw/10^4$ | Mw/Mn | $ML_{1+4}$ (100° C.) | Tcp (cps) | Tcp/ML | $3 \times 10^5$ g/mol | RMS Radius (nm) $6 \times 10^5$ g/mol | $10 \times 10^5$ g/mol |
|---|---|---|---|---|---|---|---|---|---|---|---|---|
| Example 32 | 4.4 | 1.5 | 94.1 | 15.1 | 51.9 | 3.4 | 46 | 45.0 | 0.98 | 29 | 39 | 49 |
| Example 33 | 7.0 | 2.1 | 90.9 | 13.0 | 49.6 | 3.8 | 54 | 29.8 | 0.55 | 29 | 38 | 48 |
| Comparative Example 5 | 0.4 | 0.9 | 98.7 | 22 | 52 | 2.4 | 43 | 105 | 2.4 | 32 | 43 | 54 |
| Comparative Example 6 | 0.8 | 1.6 | 97.6 | 16 | 50 | 3.2 | 40 | 48 | 1.2 | 32 | 42 | 52 |

Example 34

According to a compounding table shown below, a primary compounding was carried out to mix polybutadiene obtained by polymerization promoted under the same conditions as Example 32 with other than sulfur and vulcanizing accelerators by a Banbury mixer, and then a secondary compounding was carried out to mix sulfur and vulcanizing accelerators thereinto by a roll. The obtained compounded rubber was press-vulcanized at 150° C. for 15 minutes, whereby a vulcanizate was obtained. The result of measurement of various properties is shown in Table 4.

Compounding Table

| | part/s by weight |
|---|---|
| Polybutadiene | 60 |
| Natural rubber (RSS#1) | 40 |
| Silica *1 | 40 |
| Silane coupling agent *2 | 3 |
| Process oil | 10 |
| Zinc white (zinc oxide) | 3 |
| Stearic acid | 1 |
| Antioxidant 6C *4 | 1.5 |
| Vulcanizing accelerator CZ *5 | 1.7 |
| Vulcanizing accelerator D *6 | 2 |
| Sulfur | 1.5 |

*1 Nipsil VN3 provided by Tosoh Silica Corp.
*2 Si69 provided by Degussa
*3 NOCRAC 6C provided by Ouchi Shinko Chemical Industrial Co., Ltd.
*4 NOCCELER CZ provided by Ouchi Shinko Chemical Industrial Co., Ltd.
*5 NOCCELER D provided by Ouchi Shinko Chemical Industrial Co., Ltd.

Comparative Example 7

The same as Example 34 was carried out, except that a polybutadiene rubber BR150L provided by Ube Industries, Ltd. was used instead of polybutadiene obtained by polymerization promoted under the same conditions as Example 32. The result of measurement of various properties is shown in Table 4.

Comparative Example 8

The same as Example 34 was carried out, except that a polybutadiene rubber BR150B provided by Ube Industries, Ltd. was used instead of polybutadiene obtained by polymerization promoted under the same conditions as Example 32. The result of measurement of various properties is shown in Table 4.

TABLE 4

| | | Example 34 | Comparative Example 7 (BR150L) | Comparative Example 8 (BR150B) |
|---|---|---|---|---|
| Uncompounded rubber | $ML_{1+4}$ | 47 | 43 | 42 |
| | $T_{cp}/ML_{1+4}$ | 1 | 2.49 | 1.33 |
| Compounded product | $ML_{1+4}$ | 90 | 87 | 81 |
| | Hardness | 68 | 69 | 68 |
| | M100 (MPa) | 2.6 | 2.7 | 2.7 |
| | M300 (MPa) | 10.5 | 9.9 | 10.5 |
| | Tensile strength (MPa) | 14.9 | 18.8 | 17.9 |
| | Tensile elongation (%) | 390 | 480 | 450 |
| | ΔT (° C.) | 12.1 | 12.2 | 12.3 |
| | tanδ 50° C. | 89 | 100 | 113 |
| | Abrasion resistance | 109 | 100 | 104 |
| | Payne effect (non-vulcanizate) | 61 | 100 | 59 |

The invention claimed is:

1. A method of manufacturing a conjugated diene polymer, comprising polymerizing a conjugated diene at 60 to 120° C. in the presence of a catalyst obtained from (A) an yttrium compound, (B) an ionic compound consisting of a non-coordinating anion and a cation, and (C) an organoaluminum compound, wherein the conjugated diene polymer has the following characteristics that:
(1) a ratio ($T_{cp}/ML_{1+4}$) between a 5 wt % toluene solution viscosity ($T_{cp}$) measured at 25° C. and a Mooney viscosity ($ML_{1+4}$) at 100° C. is 0.1 to 1.2; and
(2) a content of cis-1, 4 structures is 80% or higher, and a content of 1,2 structures is lower than 5%.

2. The method of manufacturing the conjugated diene polymer according to claim 1, wherein the yttrium compound is an yttrium compound represented by a general formula (1) indicated below:

[Chemical Formula 1]

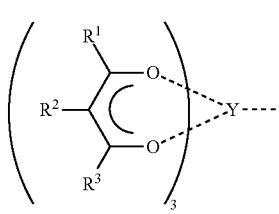

where $R^1$, $R^2$, and $R^3$ represent hydrogen or a substituent group with 1 to 12 carbon atom/s, 0 represents an oxygen atom, and Y represents an yttrium atom.

3. The method of manufacturing the conjugated diene polymer according to claim 1, wherein the conjugated diene is 1,3-butadiene.

4. A polybutadiene, comprising the following characteristics (1) to (3):
   (1) a ratio ($T_{cp}/ML_{1+4}$) between a 5 wt % toluene solution viscosity ($T_{cp}$) measured at 25° C. and a Mooney viscosity ($ML_{1+4}$) at 100° C. is 0.1 to 1.2;
   (2) a content of cis-1,4 structures is 80% or higher, and a content of 1,2 structures is lower than 5%; and
   (3) in a relationship between absolute molecular weight and average radius of gyration of molecules which are measured by GPC/MALLS method (gel filtration chromatography/multi-angle laser light scattering detection method), an average radius of gyration of molecules with respect to 300,000 g/mol is 30 to 20 nm, and an average radius of gyration of molecules with respect to 1,000,000 g/mol is 50 to 40 nm.

5. The polybutadiene according to claim 4, wherein the polybutadiene is obtained by polymerizing 1,3-butadiene by a catalyst containing yttrium.

6. A rubber composition, containing the polybutadiene according to claim 4 at 10% by weight or higher.

7. A rubber composition for tires, containing the polybutadiene according to claim 4 at 10% by weight or higher and containing at least silica as a reinforcing agent.

8. The method of manufacturing the conjugated diene polymer according to claim 2, wherein the conjugated diene is 1,3-butadiene.

9. A rubber composition, containing the polybutadiene according to claim 5 at 10% by weight or higher.

10. A rubber composition for tires, containing the polybutadiene according to claim 5 at 10% by weight or higher and containing at least silica as a reinforcing agent.

11. A method of manufacturing a conjugated diene polymer, comprising polymerizing a conjugated diene at 60 to 100° C. in the presence of a catalyst obtained from (A) an yttrium compound, (B) an ionic compound consisting of a non-coordinating anion and a cation, and (C) an organoaluminum compound, wherein the conjugated diene polymer has the following characteristics that:
   (1) a ratio ($T_{cp}/ML_{1+4}$) between a 5wt % toluene solution viscosity ($T_{cp}$) measured at 25° C. and a Mooney viscosity ($ML_{1+4}$) at 100° C. is 0.1 to 1.2; and
   (2) a content of cis-1, 4 structures is 80% or higher, and a content of 1,2 structures is lower than 5%.

12. The method of manufacturing the conjugated diene polymer according to claim 11, wherein the-yttrium compound is an yttrium compound represented by a general formula (1) indicated below:

Chemical Formula 1

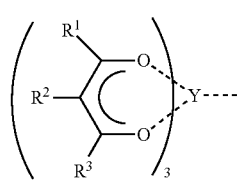

where $R^1$, $R^2$, and $R^3$ represent hydrogen or a substituent group with 1 to 12 carbon atom/s, 0 represents an oxygen atom, and Y represents an yttrium atom.

13. The method of manufacturing the conjugated diene polymer according to claim 11, wherein the conjugated diene is 1,3-butadiene.

14. The method of manufacturing the conjugated diene polymer according to claim 12, wherein the conjugated diene is 1,3-butadiene.

* * * * *